United States Patent Office 2,759,907
Patented Aug. 21, 1956

2,759,907

NEW CONDENSATION PRODUCTS OF GUANYL-MELAMINES WITH AN ALDEHYDE

Otto Albrecht, Neuewelt, near Basel, Switzerland, assignor to Ciba Limited, Basel, Switzerland, a Swiss firm No Drawing. Application April 14, 1952,
Serial No. 282,285

Claims priority, application Switzerland April 24, 1951

15 Claims. (Cl. 260—67.7)

According to this invention new condensation products of guanyl-melamines are made by reacting at least one guanyl-melamine or at least one salt of a guanyl-melamine with an aldehyde, and, if desired, by causing water-soluble salts of ammonia or amines to react upon the aldehyde condensation products in the presence of a solvent.

As guanyl-melamines there may be used for making the condensation products of this invention monoguanyl-melamine, diguanyl-melamine or triguanyl-melamine. Very suitable are mixtures of these guanyl-melamines such, for example, as result from the treatment of dicyandiamide in an inert solvent at a raised temperature with a gaseous hydrogen halide followed by the separation of the free amine from the resulting salt by the addition of a strong alkali. Monoguanyl-melamine may be given the following formula

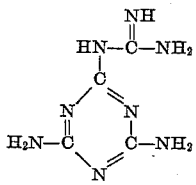

Instead of the free guanyl-melamines or mixtures thereof there may be used their salts with hydrohalic acids such as hydrofluoric acid, hydrochloric acid or hydrobromic acid, or salts with organic acids such as formic acid or acetic acid.

Furthermore, it is possible to use, as starting materials, instead of the free guanyl-melamines or their salts, substituted guanyl-melamines or salts thereof. Such substituted guanyl-melamines are obtained, for example, by condensing monocyano-melamine with a primary or secondary aliphatic, alicyclic, araliphatic, aromatic or heterocyclic amine. These substituted guanyl-melamines may correspond to the general formula

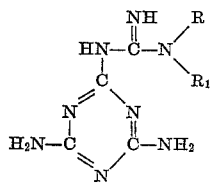

in which R represents an aliphatic, alicyclic, araliphatic, aromatic or heterocyclic radical, and $R_1$ represents hydrogen or a radical identical with R.

As aldehyde for producing the new condensation products there comes into consideration principally formaldehyde, especially in the form of an aqueous solution. However, other aldehydes, for example, acetaldehyde or acrolein may be used.

The condensation of the aldehyde with the guanyl-melamine is advantageously carried out in the presence of water or in aqueous solution. If desired, there may also be added a water-soluble solvent, for example, an alcohol of low molecular weight such as methyl alcohol or ethyl alcohol, or an ether such as dioxane.

The condensation can be carried out at ordinary temperature, but it is preferable to work at a higher temperature, for example, at 50–100° C. The condensation may be carried out in a neutral medium. However, it is also possible to conduct the condensation with the addition of a substance of alkaline or acid reaction. As acids which may be added, if desired, there are suitable inorganic acids, such as hydrochloric acid or sulfuric acid, or water-soluble organic acids, especially fatty acids of low molecular weight such as formic acid or acetic acid. As substances having an alkaline reaction, which may be added to the reaction mixture, there come into consideration principally alkali hydroxides and alkali carbonates. The proportion of the substances of acid or alkaline reaction to be added may vary within wide limits. If desired, the condensation may be conducted under superatmospheric pressure. The duration of the reaction depends on the reaction temperature and on the ease with which the starting materials react.

The relative proportions of the guanyl-melamine and aldehyde may vary within wide limits. Especially valuable products are obtained by using more than 1 molecular proportion, and preferably 2–6 molecular proportions, of formaldehyde for each molecular proportion of guanyl-melamine.

In order to produce concentrated dry preparations the solvent used may be removed by distillation, advantageously under reduced pressure. The concentration is advantageously carried out at as low a temperature as possible.

For the optional further condensation of the aldehyde condensation products with water-soluble salts of ammonia or amines, there come into consideration salts with organic or inorganic acids. Thus there may be used, for example, sulfates, chlorides, acetates or formates. These salts may be derived from ammonia but also from primary, secondary or tertiary aromatic, araliphatic, cycloaliphatic and especially heterocyclic or aliphatic amines which may be monovalent or multivalent and may, if desired, contain further substituents. Of the aliphatic type there may, for example, be mentioned salts of methyl-, dimethyl-, trimethyl-amine or ethyl-, diethyl- or triethylamine, salts of butyl- or amylamines, further salts of oxyalkylamines, such as ethanolamine, diethanolamine, triethanolamine, oxypropylamines or oxybutylamines as, for example, butyl diethanolamine. Among the multivalent aliphatic amines, there may be mentioned salts of alkylene diamines, such as ethylene diamine, 1,3-propylene diamine or 1,6-hexamethylene diamine, and also salts of their alkyl or oxyalkyl substitution products. Instead of salts of alkylene diamines there may also be used salts, as for example hydrochlorides, of polyalkylene polyamines, such as diethylene triamine, triethylene tetramine, tetraethylene pentamine or of polyalkylene polyamines of still higher molecular weight. Further, there may also be used salts of polyamines such as are obtained when ethylene dihalides or glycerine dichlorhydrines are heated with ammonia or amines, for example alkanolamines, such as methanolamine.

Of the salts of aromatic amines there may, for example, be used salts of aniline, toluidines, para-dimethylamino aniline or phenylene diamines. From the cycloaliphatic series there may be mentioned, for example, salts of the cyclohexylamine or hexahydro-ortho-phenylene diamine. Among the salts of the heterocyclic series there come into consideration especially those of pyridine and its derivatives, such as methyl pyridines or pipecolines.

The further condensation of the aldehyde condensation products with the water-soluble salts of ammonia or amines is carried out in the presence of a solvent. Such solvents are, for example, water, aliphatic acids of low molecular weight, such as formic acid or acetic acid, but there may also be used as solvents tertiary amines which are free from reactive hydrogen atoms, as, for example, pyridine and also lower alcohols. It may be appropriate to use simultaneously condensing agents, preferably of an acid nature, and/or to effect condensation in the presence of an excess of aldehyde. It is of advantage to carry out the condensation at a raised temperature, for example, at 50–100° C. Temperature and time of the condensation are dependent on the starting compounds used. The most favorable conditions may easily be determined by means of preliminary trials. Special care has to be taken that the condensation does not proceed too far as products would thus be formed which are insoluble in water also in the form of their salts and would thus not be suitable for many purposes. It is further possible to effect the condensation with salts of ammonia or amines simultaneously with the first condensation between the guanyl-melamines and the aldehydes.

For the products obtained according to the process of the invention there is a wide range of applications in the plastic industry; they may be used, for example, as moulding compounds or as additions thereto. In so far as the products are soluble in water at least in the form of their salts, they are especially suitable for improving the wet fastness properties of dyeings or prints, produced with water-soluble direct-dyeing dyestuffs which owe their solubility in water to the presence of sulfonic acid groups or carboxyl groups. For this purpose the dyeing is after-treated with an aqueous solution of the condensation product. This treatment may be combined with an after-treatment with a water-soluble copper compound. By these treatments there is obtained a substantial improvement in the fastness to water and washing of the dyeings and prints. The new water-soluble condensation products or mixtures thereof with water-soluble copper salts may be added to a liquor which is used for imparting a crease-resistant finish.

Dyeing and prints, of which the properties of fastness are to be improved by the present process, may be produced on any desired material, for example, on animal fibrous materials, such as wool or silk, and especially on fibrous materials of cellulose, such as cotton, linen, artificial silk and staple fibers, of regenerated cellulose and the like. For producing such dyeings or prints there are used direct-dyeing dyestuffs, which are soluble in water or in the usual dyebaths, which may be rendered weakly alkaline, for example, alkaline with sodium carbonate, and there may also be used dyestuffs which already contain metal in complex union. When copper compounds are used in the after-treatment of this invention, it is of special advantage to treat dyeings or prints produced with water-soluble direct dyeing dyestuffs which contain at least once the atomic grouping

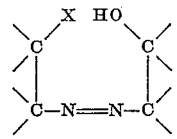

in which the pair of carbon atoms bound to X belongs to a cyclic diazo component, and the pair of carbon atoms to which the hydroxyl group is bound are those of any desired coupling component, and X represents an OH— or —COOH— group. Dyestuffs of this type, in so far as they are to be applied to fibers of cellulose or regenerated cellulose, have hitherto been used predominantly either in the form of their complex copper compounds for direct dyeing or as after-coppering dyestuffs, in the latter case the after-treatment of the dyeings with an agent yielding copper being carried out either in a second bath, for example, in a weakly acid solution, or directly in the alkaline dyebath itself. As compared with these known procedures the new process is distinguished by the fact that in general dyeings having improved properties of wet fastness are produced.

If desired, the direct dyeing dyestuffs used may contain, in addition to the atomic grouping of the above formula, further atomic groupings capable of forming metal complexes such, for example, as the salicylic acid grouping.

The after-treatment of dyeings or prints in accordance with the present invention with aqueous solutions of the aforesaid condensation products which may, for example, be of 0.05 to 1 per cent. strength, may be carried out at room temperature or at a raised temperature, for example, at 70–75° C.

In addition to the aforesaid condensation products, the after-treatment baths may also contain soluble copper salts, for example copper sulfate, copper formate or copper acetate. In many cases the use of copper salts has the effect that any impairment in the fastness to light of the dyeings or prints which the aforesaid condensation products may otherwise tend to cause does not occur or occurs only to a small extent. The addition of the copper compounds may also have a favorable influence on the improvement in the fastness to washing.

Instead of the above mentioned copper salts of inorganic or organic acids there may be used water-soluble complex copper salts. Among these complex copper salts there may be mentioned those containing, for example, ammonia or an amine, such as trimethylamine, triethanolamine, ethylene diamine, pyridine or 8-amino-quinoline, for example, complex formates, acetates, sulfates, chlorides or nitrates. Among these there may be mentioned:

Cupric-tetramine acetate, cupric tetramine sulfate, cupric tetramine sulfamate, cupric tetramine nitrate, cupric diethylene diamine acetate, and also the complex compound from cupric acetate and triethanolamine. There also come into consideration complex copper compounds of oxy-carboxylic acids such as glycollic acid, lactic acid, or tartaric acid, for example, copper-sodium tartrate (known in solution as Fehling solution).

The use of complex copper salts, instead of non-complex copper salts, may have the advantage of greatly improving the fastness to washings or of considerably reducing the impairment to the fastness to light which may be caused by the aforesaid condensation products as compared with the use of non-complex copper salts.

Instead of using the aforesaid condensation products together with the copper compounds, the copper compounds may be applied in a special bath after the treatment with the condensation product. In general, however, the single bath after-treatment is preferable owing to its greater simplicity.

When complex copper salts are used together with the aforesaid aldehyde condensation products, the condensation product and the complex copper compound may be dissolved in water to prepare the after-treatment bath.

For preparing after-treatment liquors, containing copper compounds it is also possible to start from mixtures, which contain in addition to the condensation product a copper compound, which may be non-complex or complex.

The following examples illustrate the invention, the parts being by weight:

*Example 1*

10.2 parts of the mixture, described below, of guanyl-melamine hydrochloride, containing monoguanyl-melamine hydrochloride as the main constituent, are dissolved at 70–75° C. in 16.2 parts of exactly neutralized formaldehyde solution of 37.1 per cent. strength. As soon as dissolution has occurred, the whole is cooled and dried at 40–45° C. under reduced pressure. The drying should be as rapid as possible in order to prevent the formation of insoluble constituents. The solid colorless residue so obtained is soluble in boiling water.

The above described mixture of guanyl-melamine hydrochlorides may be prepared as follows:

A mixture of 160 parts of anhydrous pyridine and 240 parts of nitrobenzene is saturated with hydrogen chloride gas at 90° C. After heating up to 110° C., 100 parts of dicyandiamide are added in small portions at that temperature while introducing hydrogen chloride gas.

In this way a further addition of dicyandiamide is only made when the reaction mixture is again saturated with hydrogen chloride gas. When the addition is complete the whole is heated for a further 15 minutes at 110° C. with the introduction of hydrogen chloride gas, then cooled to 50° C., and the solid constituents which separate from the mother liquor are separated. These solid reaction products are dissolved at 90–100° C. in about 700 parts of water, and the pH value is adjusted to 5–9 by the addition of ammonia solution. After separating a small amount of solid impurities the resulting solution is cooled to 5° C., and the reaction product which precipitates from the mother liquor is separated and dried.

Example 2

6.8 parts of a mixture described below, of guanyl-melamines are dissolved at 65–70° C. in 12.8 parts of an exactly neutralized formaldehyde solution of 37.1 per cent. strength, and then the resulting solution is heated for about 10 minutes on a boiling water-bath. After drying, which is advantageously carried out at 40–45° C. under reduced pressure, there is obtained a solid residue which is easily soluble in warm water.

The mixture of melamines described above may be prepared as follows:

168 parts of dicyandiamide are dissolved in 600 parts of hot phenol, and then 70 parts of gaseous hydrogen chloride are introduced at 120° C. while stirring. The whole is allowed to cool to 40° C. then mixed with 2000 parts of acetone, and the precipitated reaction product is separated from the mother liquor. After washing with acetone, the resulting mixture of guanyl-melamine hydrochlorides is dried to about 60° C. In order to convert the free base in the mixture 20.4 parts of the hydrochloride mixture are dissolved at 50–60° C. in 50 parts of water, and then 13.3 parts of sodium hydroxide solution of 30 per cent. strength are added, and the whole is cooled to about 5° C. and the precipitated mixture of bases is separated from the mother liquor. After washing with a small amount of ice water the resulting mixture of guanyl-melamines is dried.

Example 3

50 parts of the mixture of guanyl-melamine hydrochlorides described in Example 2 are dissolved in a mixture of 79 parts of formaldehyde solution of 37.1 per cent. strength and 2.5 parts of glacial acetic acid at 75–80° C. As soon as dissolution has occurred, the reaction product is dried at as low a temperature as possible, for example at 40–45° C., under reduced pressure. The resulting solid residue is soluble in boiling water.

Example 4

10.2 parts of the mixture, described below, of guanyl-melamines are dissolved in 16.2 parts of exactly neutralized formaldehyde solution of 37.1 per cent strength at 60–65° C., and then the whole is heated for ½ hour in a boiling water bath. After drying at a low temperature, advantageously at 40–45° C. under reduced pressure, there is obtained a solid residue which is soluble in warm water.

The above described mixture of guanyl-melamine hydrochlorides may be prepared as follows:

100 parts of finely pulverized dicyandiamide are suspended in 1000 parts of toluene by rapid stirring, and then dry hydrogen chloride gas is introduced while heating in a boiling water bath for about 6 hours. After cooling, the insoluble solid residue is separated from the solvent and dried at 95° C.

Example 5

3.25 parts of the formaldehyde condensation product described below are dissolved in as little hot water as possible, 0.5 part of ammonium chloride is added and the whole is heated for about 10 minutes at 80–85° C. The reaction product dried at low temperature, advantageously at about 40–50° C. under reduced pressure, forms a compact mass which is soluble in boiling water to give a clear solution. The new condensation product can be used for improving the wet fastness properties of dyeings produced with acid dyestuffs.

The above mentioned formaldehyde derivative, which serves as starting material, may be prepared as follows. 6.8 parts of the mixture of guanyl-melamines described in the last paragraph of Example 2 are dissolved at 60–70° C. in 12.8 parts of exactly neutralized formaldehyde solution, whereupon the so obtained solution is heated for 5 minutes at 80–85° C. and then dried at a low temperature under reduced pressure. There is thus obtained a compact residue which is soluble in hot water.

Example 6

6.5 parts of the formaldehyde condensation product described below are dissolved in 10 parts of concentrated formic acid while heating to about 50° C. and there is then added 1 part of finely pulverized ammonium chloride. The temperature is raised to 60° C. whereupon thickening occurs. 10 parts of cold water are added and the whole is heated for about 5 minutes in a boiling water-bath. The thus obtained clear solution is dried at 40–50° C. under reduced pressure. A solid residue is obtained which is soluble in boiling water and which may be used to improve wet fastness properties of dyeings made with acid dyestuffs. The abovementioned formaldehyde condensation product serving as starting material can be prepared as follows:

100 parts of the mixture of guanyl-melamine hydrochlorides described in the last paragraph of Example 1 are dissolved in about 150 parts of warm water, minor impurities are filtered off, and the remainder is treated with 100 parts by volume of a hot soda solution of 39.3 per cent. strength. After diluting with approximately 100 parts of water the whole is cooled, the precipitate separated from the mother liquor and the resulting product dried.

10 parts of this mixture of guanyl-melamines are dissolved in 19 parts of a formaldehyde solution of 37.3 per cent strength at 75–80° C. and maintained at this temperature for about 20 minutes. The solid residue obtained at a low temperature under reduced pressure is soluble in hot water.

Example 7

6.5 parts of the condensation product from formaldehyde and the mixture of guanyl-melamines, as described in the last paragraph of Example 6, are dissolved in 10 parts of concentrated formic acid while heating to about 40° C. and subsequently adding 2.3 parts of pyridine hydrochloride. The temperature of the heating bath is raised to 98° C. and maintained at this level until thickening of the reaction solution occurs, that is to say, for about 2 minutes. Then the whole is diluted with 10 parts of cold water and heated for a further 3 minutes in a boiling water bath. After drying at 40–50° C under reduced pressure, there is obtained a solid residue which is soluble in water and which may be used for improving the wet fastness properties of dyeings made with acid dyestuffs.

Example 8

6.5 parts of the condensation product from formaldehyde and the mixture of guanyl-melamines described in the last paragraph of Example 6 are dissolved in 10 parts of concentrated formic acid while heating at about 40°

C. and subsequently adding 1.3 parts of finely powdered ethylene diamine dihydrochloride. The temperature is raised to 75–80° C. whereby thickening occurs, 10 parts of cold water are added, and the whole is heated for about 5 minutes in a boiling water bath. The resulting clear solution is dried at 40–50° C. under reduced pressure. There is obtained a solid, water-soluble residue, which may be used to improve the wet fastness properties of dyeings made with acid dyestuffs.

*Example 9*

100 parts of a fabric of staple fibers of regenerated cellulose, which has been dyed with 2.7 per cent. of the symmetrical urea compound of the monoazo-dyestuff from diazotized 1-amino-8-hydroxynaphthalene-3:6-disulfonic acid and 1 mol of 1-amino-2-methoxy-5-methylbenzene, is treated with an aqueous solution which contains, per liter, 150 grams of methylol-urea, 7.5 grams of ammonium chloride, 9 grams of the formaldehyde condensation product described in Example 1 and 6 grams of copper acetate. After squeezing, the fabric is dried in 10 minutes at 140° C. and then washed at 30–40° C. for 10 minutes at a goods-to-liquor ratio of 1:30 with a solution containing, per liter, 4 grams of sodium carbonate and 0.5 gram of a synthetic detergent. The fabric is then rinsed and dried. In this manner there is obtained a material having a crease-resistant finish and a dyeing having a high degree of fastness to washing.

*Example 10*

100 parts of a cotton fabric, which has been dyed with 0.8 per cent. of the copper compound of the azodyestuff from 1 mol of tetrazotized dianisidine and 2 mols of hydroxynaphthalene-3:6-disulfonic acid (obtained by coppering accompanied by demethylation) are after-treated for ½ hour at 20° C. in a liquor which has been prepared by dissolving 2 parts of the formaldehyde condensation product described in Example 2 in 3000 parts of water. The fabric is then centrifuged and dried. In this manner the fastness to water of the dyeing is substantially improved. The improvement in fastness to water so produced persists even after strong steaming.

*Example 11*

100 parts of cotton fabric, which has been dyed with 0.8 per cent. of the copper compound of the azo dyestuff from 1 mol of tetrazotized dianisidine and 2 mols of 2-hydroxynaphthalyene-3:6-disulfonic acid (obtained by coppering accompanied by demethylation), are after-treated for ½ hour at 20° C. in a liquor which has been prepared by dissolving 2 parts of the formaldehyde condensation product described in Example 1 in 3000 parts of water. The fabric is then centrifuged and dried. In this manner there is produced a considerable improvement in the fastness of the dyeing to washing with soap and sodium carbonate at 40° C.

What is claimed is:

1. A dry condensation product of formaldehyde and at least one guanyl-melamine which at least in the form of its salts is soluble in water and which has been obtained by a process comprising reacting at least one member selected from the group consisting of guanyl-melamines and salts thereof with formaldehyde.

2. A dry condensation product of formaldehyde and at least one guanyl-melamine which at least in the form of its salts is soluble in water and which has been obtained by reacting one mol of a mixture of a member selected from the group consisting of guanyl-melamines and salts thereof with 2–6 mols of formaldehyde in the presence of water at 50–100° C. and evaporating the reaction mixture under reduced pressure at 40–50° C., said mixture of salts being obtained by treating dicyandiamide in a solvent at a raised temperature with a gaseous hydrogen halide and said mixture of guanyl-melamines being obtained by separating the free amines from the said salts by the addition of a strong alkali.

3. A dry condensation product of formaldehyde and at least one guanyl-melamine which at least in the form of its salts is soluble in water and which has been obtained by reacting one mol of a mixture of guanyl-melamines with 4 mols of formaldehyde in the presence of water at 50–100° C. and evaporating the reaction mixture under reduced pressure at 40–50° C. said mixture of guanyl-melamines being obtained by treating dicyandiamide in a solvent at a raised temperature with gaseous hydrogen chloride and transforming the said mixture of hydrochlorides into a mixture of the guanyl-melamines by treating with a strong alkali.

4. A dry, water-soluble condensation product of formaldehyde, at least one guanyl-melamine and a water-soluble ammonium salt which has been obtained by reacting at least one member selected from the group consisting of guanyl-melamines and salts thereof with formaldehyde and condensing the condensation product with a water-soluble ammonium salt in the presence of a solvent and evaporating the reaction mixture.

5. A dry, water-soluble condensation product of formaldehyde, at least one guanyl-melamine and a water-soluble ammonium salt which has been obtained by reacting at least one member selected from the group consisting of guanyl-melamines and salts thereof with formaldehyde and condensing the condensation product with ammonium chloride in the presence of water and evaporating the reaction mixture.

6. A dry, water-soluble condensation product of formaldehyde, at least one guanyl-melamine and a water-soluble ammonium salt which has been obtained by reacting one mol of a mixture of guanyl-melamine hydrochlorides with 2–6 mols of formaldehyde in the presence of water at 50–100° C. and condensing the condensation product with ammonium chloride in the presence of water at 80–85° C. and evaporating the reaction mixture under reduced pressure at 40–50° C., said mixture of guanyl-melamine hydrochlorides being obtained by treating dicyandiamide in an inert solvent at a raised temperature with gaseous hydrogen chloride.

7. A dry, water-soluble condensation product of formaldehyde, at least one guanyl-melamine and a water-soluble ammonium salt which has been obtained by reacting one mol of a mixture of guanyl-melamines with 2–6 mols of formaldehyde in the presence of water at 50–100° C. and condensing the condensation product with ammonium chloride at 50–100° C. in the presence of formic acid and evaporating the reaction mixture under reduced pressure at 40–50° C. said mixture of guanyl-melamines being obtained by treating dicyandiamide in a solvent at a raised temperature with gaseous hydrogen halide and separating the free amines from the resulting salts by the addition of a strong alkali.

8. A dry, water-soluble condensation product of formaldehyde, at least one guanyl-melamine and a water-soluble ammonium salt which has been obtained by reacting one mol of a mixture of guanyl-melamines with 4 mols of formaldehyde in the presence of water at 50–100° C. and condensing the condensation product with one mol of ammonium chloride at 50–100° C. in the presence of formic acid and evaporating the reaction mixture under reduced pressure at 40–50° C., said mixture of guanyl-melamines being obtained by treating dicyandiamide in a solvent at a raised temperature with gaseous hydrogen halide and separating the free amines from the resulting salts by the addition of a strong alkali.

9. A dry water-soluble condensation product of formaldehyde, at least one guanyl-melamine and a water-soluble salt of an amine which has been obtained by reacting at least one member selected from the group consisting of guanyl-melamines and salts thereof with formaldehyde and condensing the condensation product with a water-soluble salt of an amine in the presence of a solvent and evaporating the reaction mixture.

10. A dry, water-soluble condensation product of formaldehyde, at least one guanyl-melamine and a water-soluble salt of an amine which has been obtained by reacting at least one member selected from the group consisting of guanyl-melamines and salts thereof with formaldehyde and condensing the condensation product with a water-soluble salt of a heterocyclic amine in the presence of a solvent and evaporating the reaction mixture.

11. A dry, water-soluble condensation product of formaldehyde, at least one guanyl-melamine and a water-soluble salt of an amine which has been obtained by reacting one mol of a mixture of guanyl-melamines with 2-6 mols of formaldehyde in the presence of water at 50-100° C. and condensing the condensation product with pyridine hydrochloride at 50-100° C. in the presence of formic acid and evaporating the reaction mixture under reduced pressure at 40-50° C., said mixture of guanyl-melamines being obtained by treating dicyandiamide in a solvent at a raised temperature with a gaseous hydrogen halide and separating the free amines from the resulting salts by the addition of a strong alkali.

12. A dry, water-soluble condensation product of formaldehyde, at least one guanyl-melamine and a water-soluble salt of an amine which has been obtained by reacting one mole of a mixture of guanyl-melamines with 4 mols of formaldehyde in the presence of water at 50-100° C. and condensing the condensation product with one mol of pyridine hydrochloride at 50-100° C. in the presence of formic acid and evaporating the reaction mixture under reduced pressure at 40-50° C. said mixture of guanyl-melamines being obtained by treating dicyandiamide in a solvent at a raised temperature with a gaseous hydrogen halide and separating the free amines from the resulting salts by the addition of a strong alkali.

13. A dry, water-soluble condensation product of formaldehyde, at least one guanyl-melamine and a water-soluble salt of an amine which has been obtained by reacting at least one member selected from the group consisting of guanyl-melamines and salts thereof with formaldehyde and condensing the condensation product with a water-soluble salt of an aliphatic amine in the presence of a solvent and evaporating the reaction mixture.

14. A dry, water-soluble condensation product of formaldehyde, at least one guanyl-melamine and a water soluble salt of an amine which has been obtained by reacting one mol of a mixture of guanyl-melamines with 2-6 mols of formaldehyde in the presence of water at 50-100° C. and condensing the condensation product with ethylene diamine dihydrochloride at 50-100° C. in the presence of formic acid and evaporating the reaction mixture under reduced pressure at 40-50° C., said mixture of guanyl-melamines being obtained by treating dicyandiamide in a solvent at a raised temperature with a gaseous hydrogen halide and separating the free amines from the resulting salts by the addition of a strong alkali.

15. A dry, water-soluble condensation product of formaldehyde, at least one guanyl-melamine and a water-soluble salt of an amine which has been obtained by reacting one mol of a mixture of guanyl-melamines with 4 mols of formaldehyde in the presence of water at 50-100° C. and condensing the condensation product with half a mol of ethylene diamine dihydrochloride at 50-100° C. in the presence of formic acid and evaporating the reaction mixture under reduced pressure at 40-50° C. said mixture of guanyl-melamines being obtained by treating dicyandiamide in a solvent at a raised temperature with a gaseous hydrogen halide and separating the free amines from the resulting salts by the addition of a strong alkali.

References Cited in the file of this patent
UNITED STATES PATENTS

| | | |
|---|---|---|
| 2,197,357 | Widmer | Apr. 16, 1940 |
| 2,285,750 | Swain | June 9, 1942 |
| 2,312,688 | D'Alelio | Mar. 2, 1943 |
| 2,537,834 | Kaiser | Jan. 9, 1951 |
| 2,537,840 | MacLean | Jan. 9, 1951 |